(12) United States Patent
Aragon et al.

(10) Patent No.: US 9,341,486 B2
(45) Date of Patent: May 17, 2016

(54) METHODS AND SYSTEMS FOR PROVIDING GEOTEMPORAL GRAPHS

(71) Applicant: University of Washington through its Center for Commercialization, Seattle, WA (US)

(72) Inventors: Cecilia Aragon, Seattle, WA (US); Sungsoo Hong, Seattle, WA (US); Jong-Chul Yoon, Seattle, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 42 days.

(21) Appl. No.: 14/261,055

(22) Filed: Apr. 24, 2014

(65) Prior Publication Data

US 2014/0324327 A1 Oct. 30, 2014

Related U.S. Application Data

(60) Provisional application No. 61/815,573, filed on Apr. 24, 2013.

(51) Int. Cl.
*G01C 21/26* (2006.01)

(52) U.S. Cl.
CPC ...................................... *G01C 21/26* (2013.01)

(58) Field of Classification Search
None
See application file for complete search history.

(56) References Cited

U.S. PATENT DOCUMENTS

| | | | | |
|---|---|---|---|---|
| 2006/0085123 A1* | 4/2006 | Sugita | .................. | G01C 21/367 701/431 |
| 2006/0220923 A1* | 10/2006 | Tanizaki | ................ | G09B 29/10 340/995.1 |
| 2007/0027621 A1* | 2/2007 | Operowsky | ........ | G01C 21/3629 701/436 |
| 2008/0243584 A1* | 10/2008 | Srinivasan | ............. | G06Q 10/00 705/7.13 |
| 2011/0276259 A1* | 11/2011 | Nortrup | ............. | G01C 21/3667 701/118 |
| 2012/0209524 A1* | 8/2012 | Okude | ................. | G01C 21/343 701/540 |
| 2012/0283948 A1* | 11/2012 | Demiryurek | ....... | G01C 21/3492 701/533 |
| 2014/0005931 A1* | 1/2014 | Ono | ....................... | G01C 21/00 701/445 |

OTHER PUBLICATIONS

Donato et al., "Approximate Thin Plate Spline Mappings", accessed Sep. 18, 2015.*
A.M. Maceachren, "Visualization in Modern Cartography: Setting the Agenda." in: Visualization in Modern Cartography. (Pergamon, New York, 1994), pp. 1-12.
D. Dorling et al., "Worldmapper: The world as you've never seen it before." IEEE Transactions on Visualization and Computer Graphics. 12(5):757-764 (2006).

(Continued)

*Primary Examiner* — Yonel Beaulieu
*Assistant Examiner* — Krishnan Ramesh
(74) *Attorney, Agent, or Firm* — Perkins Coie LLP

(57) ABSTRACT

Technology for generating geotemporal graphs is disclosed where geotemporal graphs provide representations of areas based on an expected travel time between points, instead of the geographical distance between points. Travel times may vary based on travel conditions, and geotemporal maps may be generated that show travel times that account for travel conditions. Generating geotemporal maps may include obtaining a graph, determining for several points a warp vector indicating graph how each point should be moved to represent a travel time to that point, and warping the graph according to the determined warp vectors.

19 Claims, 7 Drawing Sheets

(56) References Cited

OTHER PUBLICATIONS

D. Nekrasovski et al., "An Evaluation of Pan & Zoom and Rubber Sheet Navigation with and without an Overview." Proceedings of ACM Special Interest Group on Computer-Human Interaction (SIGCHI) Conference on Human Factors in Computing Systems, pp. 11-20, (2006).

D. Tiesyte and C.S. Jensen., "Similarity-based prediction of travel times for vehicles traveling on known routes." in: Proceedings of the 16th ACM Special Interest Group on Spatial Information (SIGSPATIAL) International Conference on Advances in Geographic Information Systems (2008), Article No. 14.

D. Yamamoto et al., "Focus+Glue+Context: An Improved Fisheye Approach for Web Map Services." in: Proceedings of the 17th ACM Special Interest Group on Spatial Information (SIGSPATIAL) International Conference on Advances in Geographic Information Systems (2009), pp. 101-110.

E.W. Dijkstra, "A note on two problems in connection with graphs." in: Numerische Mathematik (1959), 1:269-271.

Google, "Google Glass." Retrieved from the Internet: http://www.google.com/glass/start (2012).

H. Brainerd and A. Pang, "Floating Ring: A New Tool for Visualizing Distortion in Map Projections." Computer Graphics International, 1998. pp. 466-480.

H. Vermeulen et al., "Stroley: a Historic and Illustrated Maps Platform." in: Proceedings of the Second International Conference on Culture and Computing (2011) pp. 195-196.

J. Bottger et al., "Map Warping for the Annotation of Metro." Proceedings of IEEE Pacific Visualization 2008 (PacificVIS'08). pp. 199-206 (2008).

J. Kopf et al., "Automatic Generation of Destination Maps." Proceedings of the ACM Special Interest Group on Graphics and Interactive Techniques (SIGGRAPH) Asia (2010). pp. 158:1-158:12.

J. Kramer, "Abstraction—the key to Computing?" Communications of the ACM. 50(4):36-42, 2007.

J. Lehikoinen and R. Suomela, "Perspective Map," in: International Symposium on Wearable Computers (2002), pp. 171-178.

M. Agrawala et al., "Design Principles for Visual Communication." Communications of the ACM. 54(4):60-69, 2011.

M. Newman, "Maps of the 2012 US presidential election results." Retrieved from the Internet: http://www.eprsonal.u7mich.edu/~mejn/election/2012, (2012).

T. Nakata and J. Takeuchi, "Mining traffic data from probe car system for travel time prediction." in: Proceedings of the 10th ACM Special Interest Group on Knowledge Discovery and Data Mining (SIGKDD) International Conference (2004), pp. 817-822.

Walk Score, "Walk Score." Retrieved from the Interner: http://www.walkscore.com/ (2012).

Wikipedia, "Seattle." Retrieved from the Internet: http://en.wikipedia.org/wiki/Seattle (2012).

Ahmed, Nobbir et al., *Time space transformations of geographic space for exploring analyzing and visualizing transportation systems*, J. of Transport Geography 2-17 (2007).

Angel, S. et al., *Urban velocity fields*, 2 Envir. and Planning 211-24 (1970).

Ewing, G. O. et al., *Surface feature interpolation on two-dimensional time space maps*, 9 Envir. and Planning 429-37 (1977).

Hyman, G. et al., *On the geometry of emergency service medical provision in cities*, Int'l Inst. For Applied Sys. Anal. (working paper) 1-68 (Apr. 1982).

Marchand, B., *Deformation of a transportation surface*, 63 Annals of the Ass'n of Amer. Geographers 507-21 (Dec. 1973).

\* cited by examiner

| edge ID | location: start/end | travel condition | last updated | zoom levels | travel time |
|---|---|---|---|---|---|
| e1 | 53, 14 / 105, 354 | traffic, 20 min. delay | 1/2/14 2:07 pm | 1, 3, 4 | 27.2 |
| e2 | 2, 182 / 911, 187 | no delay | 1/5/14 3:02 am | 2, 3 | 35 |
| e3 | 192, 55 / 53, 14 | weather slow-down, 15 min. delay | 1/1/14 8:16 pm | 4, 5, 6 | 16.1 |
| ... | ... | ... | ... | ... | ... |

*FIG. 5*

METHODS AND SYSTEMS FOR PROVIDING GEOTEMPORAL GRAPHS

CROSS-REFERENCE TO RELATED APPLICATION(S)

This application claims the benefit of pending U.S. Provisional Application No. 61/815,573, filed Apr. 24, 2013, which is incorporated herein by reference in its entirety.

TECHNICAL FIELD

The present technology relates generally to methods and systems for providing geotemporal graphs. In particular, several embodiments are directed toward technology for generating geotemporal graphs providing representations of areas based on an expected travel time between points instead of the geographical distance between points.

BACKGROUND

Maps provide a simple, yet powerful visualization method to represent geospatial reality. Since maps are configured to faithfully reflect real-world geography (or attempt to reflect, as effectively as possible, the three dimensional Earth as a two dimensional construct), individuals can intuitively estimate the travel time between two points on a map by measuring the distance between them and multiplying this distance by some scale to determine a "real-world" equivalent. However, other factors such as traffic, variable speed limits, weather conditions, and special events make estimating actual travel time between two points on a map difficult. Urban travel in particular is fraught with traffic congestion and uncertainty.

The apparent distances between places and the variable nature of the time needed to travel between such places regularly bewilders people because geospatially representative maps sometimes fail to represent realistic accessibility. Designers have put considerable effort into creating visualizations of graphs to aid human perception. For example, some real-time mapping systems show roadways with various colors to highlight traffic congestion in an attempt to enhance geospatial information with dynamic geotemporal information. However, people generally do not find such visualization techniques intuitive, resulting in inaccurate travel estimates and unnecessary delay.

BRIEF DESCRIPTION OF THE DRAWINGS

FIG. 5 is a diagram illustrating portions of a database for use with a geotemporal graphing system.

DETAILED DESCRIPTION

Figure 1:
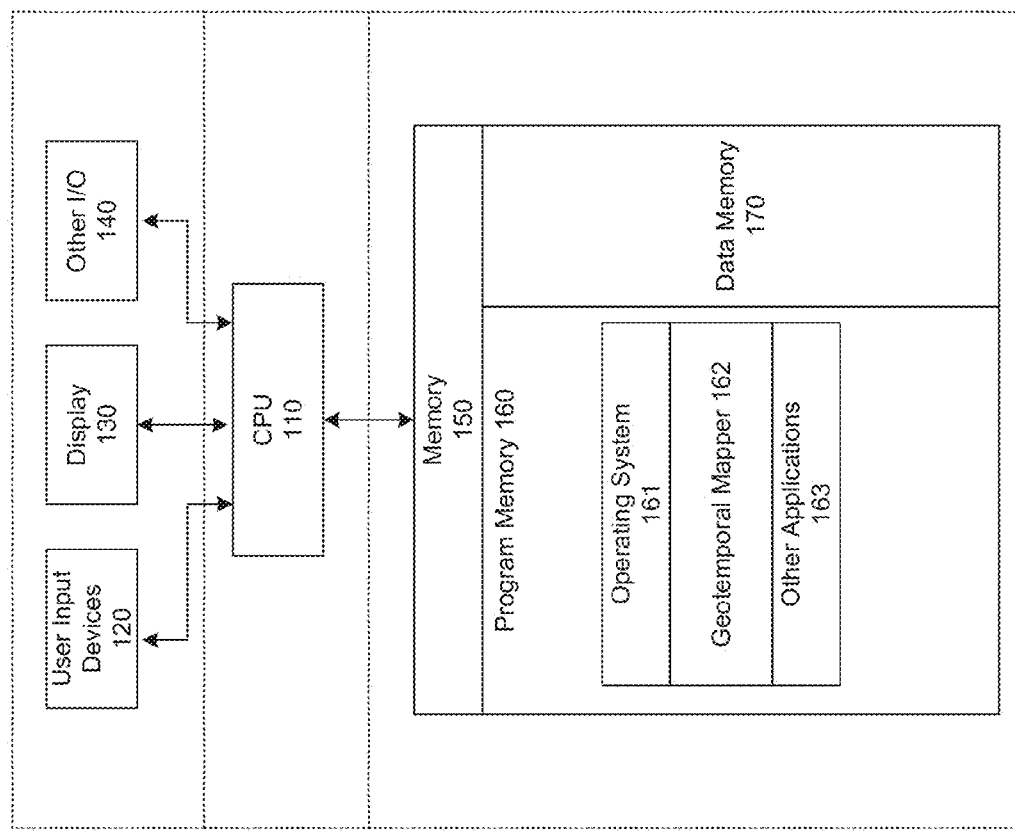
FIG. 1 is a block diagram illustrating an overview of devices on which some embodiments of the disclosed technology may operate.

The present technology is generally directed to methods and systems for providing geotemporal graphs. In particular, several embodiments are directed toward technology for generating geotemporal graphs based on an expected travel time between points instead of the geographical distance between points. In one example, a map graph showing a roadway infrastructure may be generated that displays the map centered at a start location. The displayed distances on the geotemporal graph between the start location and each other location may represent an expected travel time on the roadway infrastructure between the start location and those other locations, where the expected travel times account for traffic conditions. In some embodiments, geotemporal graphs may be generated by: obtaining a graph representing spatial relationships, adding interconnected infrastructure nodes to the graph, receiving travel conditions for the infrastructure, receiving a selection of a location within the graph, and warping the obtained graph to convert the spatial relationships from the received location to other locations to instead represent expected travel times from the received location to other locations, where the expected travel times account for the received travel conditions.

Many graphing systems represent distances between points to enable users to gain an understanding of the accessibility of some points from other points. Common uses for such graphing systems include graphs that show transportation infrastructures such as roadways, walkways, railways, shipping lanes, and air traffic. Some graphing systems may show graphs that represent other pathways through areas such as computer networks, brain pathways, information flow, electrical circuits, migration patterns, wealth disbursement, etc. In each case, a graphing system may display potential paths from one point to another. The concept of some distance between two points is quite naturally related to the cognitive notion of spatial accessibility. The proximity of two places is strongly related to how accessible they are from each other. Therefore, the construction of a graph based on spatial references effectively relates accessibility between places to the user. However, proximity may not always be the most effective measure of accessibility. A more direct metric than distance to represent spatial availability may be time. Geotemporal mapping shows representations of areas based on an expected travel time between points, instead of the geographical distance between points.

In many contexts, travel times vary based on factors, referred to herein as travel conditions, affecting infrastructure throughput. For example, in transportation infrastructures, travel conditions may include traffic, weather, route closures, vehicle departure frequency, vehicle speed or speed limits, and stop frequency. In some embodiments, geotemporal maps are generated that show travel times that account for current travel conditions, expected travel conditions based on historical models, or a combination thereof.

Generating geotemporal maps may start by obtaining a graph. As used herein, a "graph" is a spatial representation of an area that contains an infrastructure upon which elements, whether physical or conceptual, may travel. As examples, a graph may be any of the following: a representation of a geography containing various travel infrastructures (roads, walking paths, railways, etc.) across which people and vehicles may travel; a representation of a computer network containing various data paths and routers across which data signals may travel; or a data structure representing abstractions such as an area representation of interconnected social groupings or segments of society containing conceptual interconnection pathways, such as Twitter, classrooms, and television, across which ideas may travel.

Nodes may then be added to represent various points on the graph, such as point corresponding to an infrastructure nexus in the area represented by the graph. A "node," as used herein, may be any designation of a point within the graph. Node placement may be determined by an algorithm at the time nodes are added to the graph, or there may be a specified set of nodes corresponding to points on the infrastructure, and a subset of these nodes may be selected based on a current focus area and zoom level of the graph. In some embodiments, node placement or frequency may be based on a determination that an area may have a greater variation in travel times or infrastructure density. For example, for a graph including a representation of a road infrastructure, areas such as urban areas, areas that get high rush-hour use, areas commonly subject to inclement weather, or areas with historically high congestion, may be assigned more nodes than other areas with historically consistent travel times.

Once nodes are added to the graph, the node may be connected by edges that represent sections of the infrastructure. An "edge," as used herein, is a representation of a particular segment of an infrastructure represented in the graph in which the edge appears. Depending on the infrastructure, edges may be directional or un-directed, may be shown or hidden, may be straight or curved, and may have additional properties such as speed or a percent slow-down. Edge placement may be determined by an algorithm at the time they are added to the graph, or there may be a specified set of edges corresponding to segments of the infrastructure, and a subset of these edges may be used based on a current focus area and zoom level of the graph. In some embodiments, for example, adding nodes and edges may not be distinct processes, but may happen simultaneously as connected edges are added to the graph thereby defining nodes at their intersections. In some embodiments, defining the set of nodes or edges may be based, at least in part, on a crowd sourcing system where system users are able to specify locations on the graph. In some embodiments using crowd sourcing, each node or edge defined by a prior user may be added as one of the specified edges that may be added for later users. In other embodiments using crowd sourcing, each user specified node or edge may be counted as a vote for a particular node, edge, or area of the graph, and nodes or edges with a count above a threshold level may be included for subsequent users, or areas of the graph may be assigned nodes or edges according to the number of votes that area receives.

Before or after nodes and edges are added to a graph, a location on the graph may be selected. This selected location may be a user identified point on the graph, a result from a search, a default point such as the center of the current view area, a system selected point such as an identified accident site, or another point selected by a system or system user. As one example, a user may enter his or her current address. As another example, a GPS or other location service of the user's computing device may provide a particular current location of the user as a selected location.

Also before or after node, edge, and location selection, infrastructure usage data that indicates travel conditions on the infrastructure may be received. For example, infrastructure usage data may indicate, for a roadway infrastructure, current vehicular traffic or accident data, or, for an interconnected computer infrastructure, network usage and hardware failures. In some embodiments, the infrastructure usage data may be gathered from a separate server that tracks live travel conditions or may be retrieved from most recent data in a database that is updated periodically. In some embodiments, the usage data may also be an estimation based on historical data. Estimations may take into account other known conditions such as an indicated time of day, season, planned event data such as parades, sporting events, and concerts, or public transportation schedules. In some embodiments, the travel conditions may be for the present time, while in other embodiments the travel conditions may be a prediction for a future time using estimations of historical data and extrapolations from current travel conditions.

Using the received travel conditions, travel times may be calculated from the selected location to one or more of the nodes added to the graph, where the travel times may be based on travel along the edges added to the graph. In some embodiments, for example, the calculated travel times may be for a shortest expected travel time determined using an algorithm (such as Dykstra's algorithm) and also taking into account the infrastructure usage data. In a graph including a roadway infrastructure, an expected travel time may be attributed to each edge according a determined rate that traffic conditions indicate vehicles are moving along that edge. In some embodiments, travel times may be round trip times between the selected location and each of the one or more nodes added to the graph. Where edges are directional, there may be different travel rates along edge directions between the same two nodes, different travel conditions between two nodes, or there may be different shortest paths traveling in different directions between the same two graph points.

Once travel times are calculated, a vector that defines the gap between temporal accessibility and geography may be assigned to each graph node. These vectors are defined herein as warp vectors. The direction for the warp vector of a node may be in a continuation of a line connecting that node with the selected location. The distance of the warp vector of a node, for example, may be how far on the graph that node would be moved in the direction so that the distance on the graph between that node and the selected location is a consistent representation across all nodes, of the calculated travel time between that node and the selected location. Put another way, warp vectors for each of multiple points on a graph may each identify where to move that point such that its displayed distance from a start point corresponds to the travel time from the start point to that point, instead of its geographical distance. For example, if a travel time to a first node is calculated be 5 minutes and travel time to a second node is calculated to be 10 minutes, the resulting warp vectors would identify that the first and second nodes should be moved so that the second node is twice as far away on the graph from the selected location as the first node. Using the defined warp vectors, a warping algorithm may be applied to the graph, such that each node is moved according the distance and direction identified in that node's corresponding warp vector. In some embodiments, the graph and the warp vectors may be supplied to a thin-plate spline-based warping algorithm, which may warp the graph so each node is at the location defined by its warp vector.

In some embodiments, one or more of the nodes added to a graph may correspond to multiple potential start positions and the selected location may correspond to an end location. The travel times for each node may then be calculated, using travel conditions, from each start location to the end location. Warp vectors may be calculated for each start location using the calculated travel times, and the graph may be warped to show a resulting geotemporal mapping that shows the accessibility of the destination from each start location. For example, multiple emergency personnel vehicles may be located at various places on a map around an accident site. If each emergency vehicle is defined as a start location, and the accident site is specified as an end location, a resulting geotemporal mapping may help a dispatcher quickly determine that, an emergency vehicle can quickly arrive at the accident scene while leaving a good distribution of emergency vehicles across other areas of the map.

Specific details of several embodiments of the present technology are described herein with reference to FIGS. 1-7. Although various embodiments are described below with respect to methods and systems for providing geotemporal graphs, other embodiments of the present technology can have different configurations, components, or procedures than those described herein. For example, other embodiments can include additional elements and features beyond those described herein, or other embodiments may not include several of the elements and features shown and described herein.

FIG. 1, for example, is a block diagram illustrating an overview of a device 100 on which some embodiments of the disclosed technology may operate. The device 100 includes one or more input devices 120 that provide input to the CPU (processor) 110, notifying it of actions performed by a user. The actions are typically mediated by a hardware controller that interprets the signals received from the input devices 120 and communicates the information to the CPU 110 using a known communication protocol. Input devices 120 can include, for example, a mouse, a keyboard, a touchscreen, an infrared sensor, a touchpad, wearable input devices, a camera or image-based input device, microphone, or other input devices.

The CPU 110 may be a single processing unit or multiple processing units in a device or distributed across multiple devices. The CPU 110 may be coupled to other hardware devices, for example, with the use of a BUS, such as a PCI BUS or SCSI BUS. Further, the CPU 110 may communicate with a hardware controller for devices such as for a display 130. The display 130, for example, may be used to display text and graphics. One example of a suitable display 130 is a touchscreen that provides graphical and textual visual feedback to a user. In some implementations, the display 130 includes the input devices 120 as part of the display, such as when the input device is a touchscreen. In some implementations, the display 130 is separate from the input device 120. Examples of standalone display devices include, for example, an LCD display screen, an LED display screen, a projected display (such as a heads-up display device), and so on. Other I/O devices 140 may also be coupled to the CPU 110, such as a video or audio card, USB or other external devices, printer, speakers, CD-ROM drive, DVD drive, disk drives, or Blu-Ray devices. In some implementations, other I/O devices 140 also include a communication device capable of communicating wirelessly or wire-based with a network node. The communication device may communicate with another device or a server through a network using, for example, TCP/IP protocols. For example, the device 100 may utilize the communication device to distribute operations across multiple network devices.

The CPU 110 has access to a memory 150. The memory 150 includes one or more of various hardware devices for volatile and non-volatile storage, and may include both read-only and writable memory. For example, the memory 150 may comprise random access memory (RAM), read-only memory (ROM), writable non-volatile memory, such as flash memory, hard drives, floppy disks, CDs, DVDs, magnetic storage devices, tape drives, device buffers, and so forth. The memory 150 is not a propagating electrical signal divorced from underlying hardware, and is thus non-transitory. The memory 150 further includes program memory 160 that contains programs and software, such as an operating system 161, geotemporal mapper 162, and any other application programs 163. The memory 150 also includes data memory 170 that includes any configuration data, settings, user options and preferences that may be needed by the program memory 160 or by any element of the device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, tablet devices, e-readers, multiprocessor systems, microprocessor-based systems, set-top boxes, programmable consumer electronics, network PCs, minicomputers, mainframe computers, distributed computing environments that include any of the above systems or devices, and the like.

Figure 2:
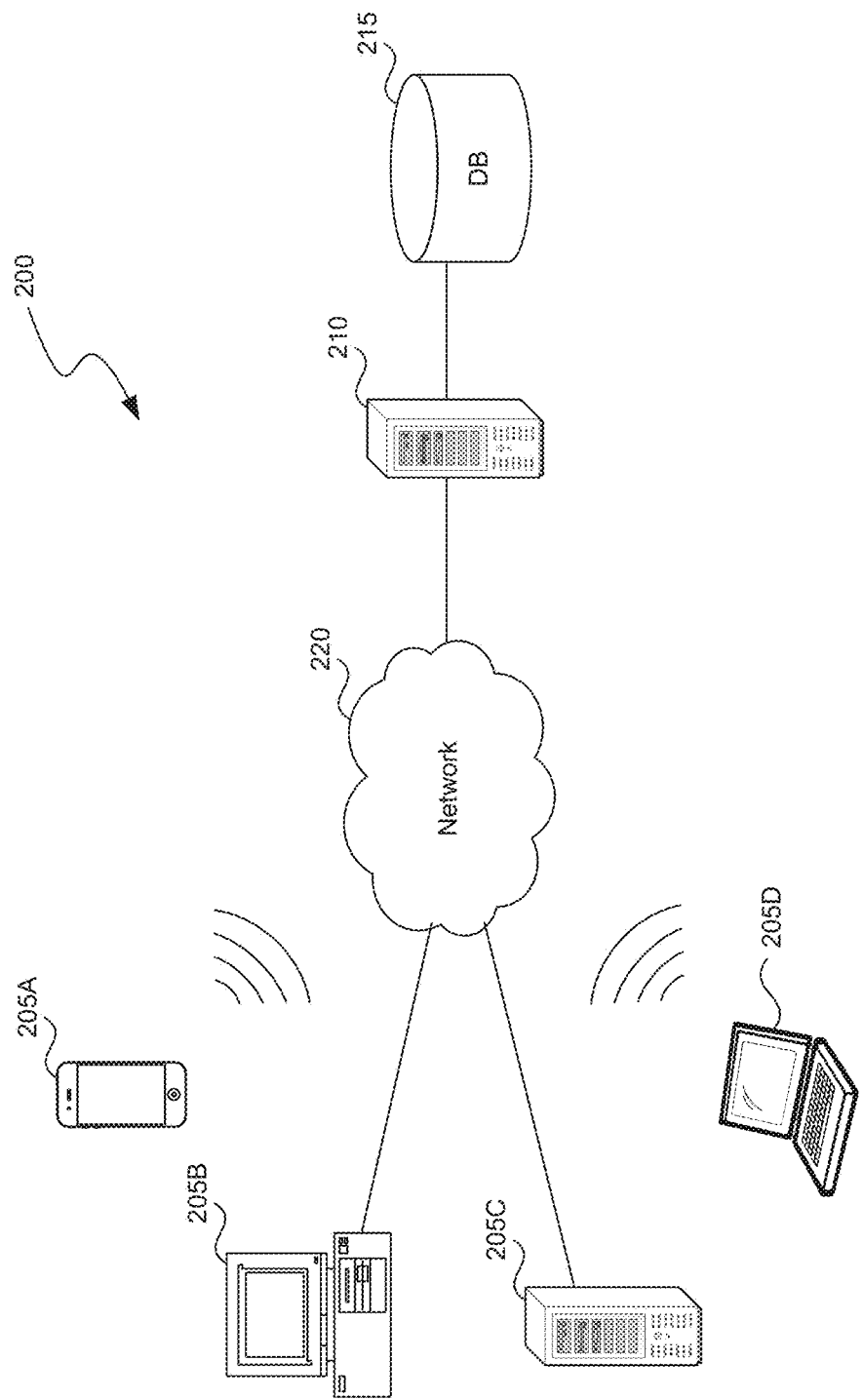
FIG. 2 is a block diagram illustrating an overview of an environment in which some embodiments of the disclosed technology may operate.

FIG. 2 is a block diagram illustrating an overview of an environment 200 in which some embodiments of the disclosed technology may operate. An environment for implementing the technology may include, for example, client computing devices 205 (illustrated here as individual client computing devices 205A-D), an example of which may include the device 100. Client computing devices 205 may operate in a networked environment using logical connections to one or more remote computers such as a server computing device 210 through network 220. Client computing devices 205 and the server computing device 210 may each act as a server or client to other server/client devices. Server computing device 210 may connect to a database 215.

The network 220 can be a local area network (LAN), a wide area network (WAN), or other wired or wireless networks. The client computing devices 205 can be connected to the network 220 through a network interface, such as by a wired or wireless network.

Figure 3:
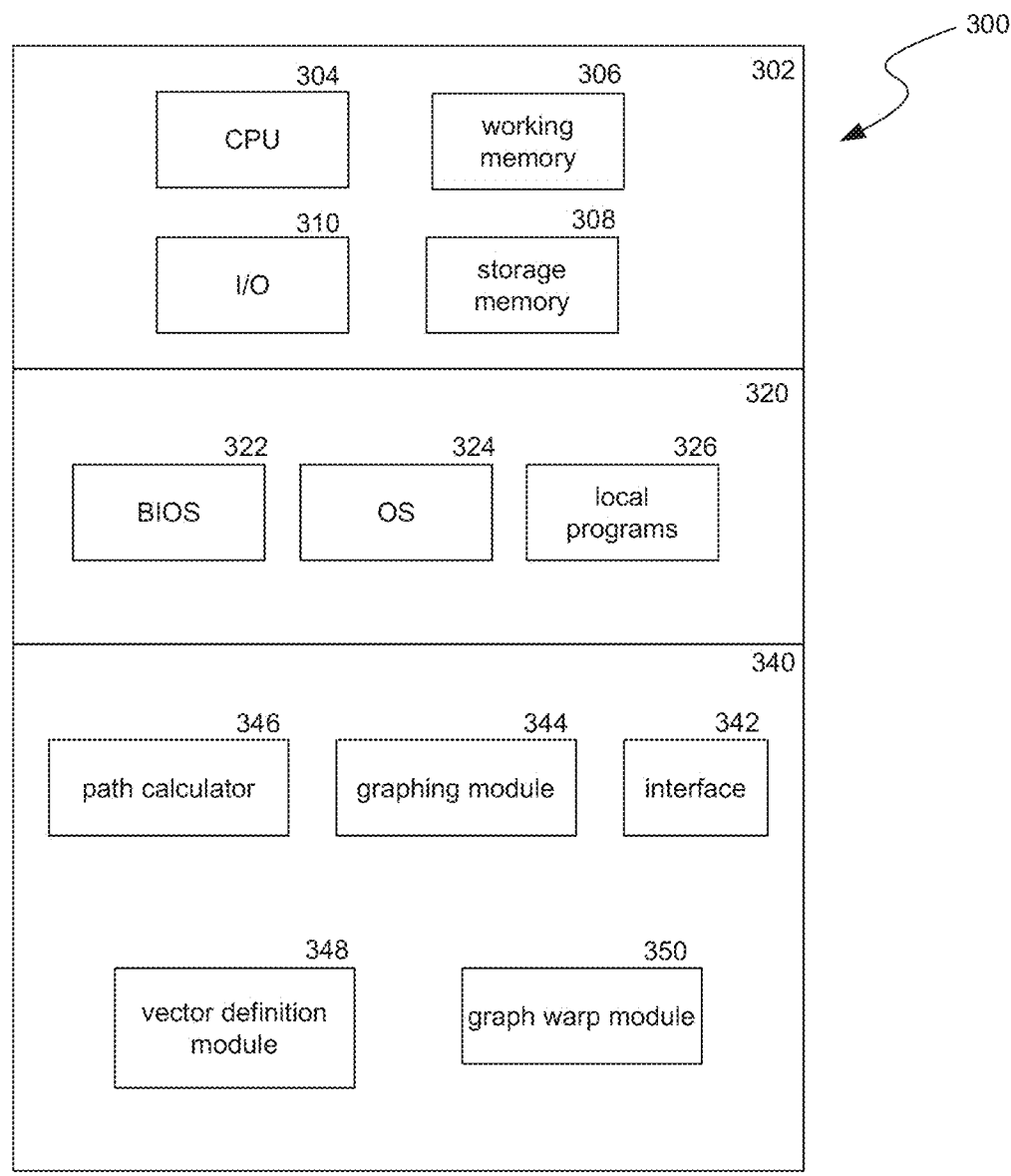
FIG. 3 is a block diagram illustrating components which, in some embodiments, may be used in a system implementing the disclosed technology.

FIG. 3 is a block diagram illustrating components 300 which, in some embodiments, may be used in a system implementing the disclosed technology. The components 300 include, for example, hardware 302, general software 320, and specialized components 340. As discussed above, a system implementing the disclosed technology may use various hardware including a central processing unit 304, working memory 306, storage memory 308, and input and output devices 310. The components 300 may be implemented in a client computing device (such as client computing devices 205) or on a server computing device (such as server computing device 210).

The general software 320 may include various applications including a BIOS 322, an operating system 324, and local programs 326. The specialized components 340 may be subcomponents of the general software 320, such as of a local program 326. The specialized components 340 may include, for example, an interface 342, graphing module 344, path calculator 346, vector definition module 348, and graph warp module 350.

User input and data may be received by the interface 342. For example, data from external systems such as current or past travel conditions, data for various graphs such as of road infrastructures, and indications of user input indicating interactions with a user interface (UI) such as graph point indications, zoom levels, focus areas, search terms, or time selections may be received by the interface 342.

The graphing module 344 may access various graphs and build graph displays for presentation to a user. Graphing module 344 may also receive indications of selected locations and add nodes and edges to the graph. In some embodiments, for example, added nodes and edges may be displayed on the graph. In other embodiments, added nodes and edges may not be visible on the graph displayed to a user. In several embodiments, the graphing module 344 may generate graph displays with markers such as landmarks or placement of emergency vehicles. The path calculator 346 may receive an indication of a location selection within a graph generated by graphing module 344 and may calculate, for each of the nodes added to the graph by graphing module 344, a travel time along the edges of the graph from the selected location to one or more of the other nodes of the graph.

The vector definition module 348 may receive an indication of the calculated travel times and may determine a warp vector for each node indicating how far, a location emanating line, the node would have to be moved so that the distance on the graph between that node and the selected location is a consistent representation, across all nodes, of the calculated travel time between that node and the selected location. As used herein, a location emanating line for a node, is the line starting with the selected location and continuing through that graph node. Conceptually, a graph will have a location emanating line for each node.

In some embodiments, the node with the shortest travel time may not be moved and the formula for calculating the length of each other warp vector may be:

$$((nTravel/cTravel)*cDist)-nDist$$

where cTravel=travel time for the closest node; nTravel=travel time for this node; cDist=distance between selected location and closest node; nDist=distance between selected location and this node. By way of example, there may be three nodes on the graph other than the selected location spaced at 1 unit, 1.2 units, and 4 units from the selected location with calculated travel times of 5 minutes, 10 minutes, and 15 minutes, respectively. In this example, the length of the first warp vector may be 0, indicating the first node should not be moved; the length of the second warp vector may be ((10/5)*1)-1.2, which is 0.8, indicating the second node should be moved 0.8 units further away from the selected location, and the length of the third warp vector may be ((15/5)*1)-4, which is −1, indicating the third node should be moved 1 unit closer to the selected location.

In some embodiments, warp vectors may be calculated on a per-time basis. In these embodiments, points are added to the graph along one or more of the location emanating lines corresponding to a travel time to that point (i.e. at particular interval such as one for every minute of travel times). A circle connecting all the points for a particular time interval is referred to herein as an isochronous contour. Warping vectors may then be calculated for each of the points along the location emanating lines. In some embodiments warp vectors are also calculated for one or more of the other nodes as well as the points along the location emanating lines.

The graph warp module 350 may receive a graph from the graphing module 344 and warp vectors from the vector definition module 348 and may apply a warping algorithm to generate a geotemporal graph. In some embodiments, for example, the warping algorithm may be a thin-plate spline-based warping algorithm.

Those skilled in the art will appreciate that the components illustrated in FIGS. 1-3 described above, and in each of the flow diagrams discussed below, may be altered in a variety of ways. For example, the order of the logic may be rearranged, sub-steps may be performed in parallel, illustrated logic may be omitted, other logic may be included, etc. Some processes described below may use recursive algorithms. Those skilled in the art will further appreciate that equivalent implementations may be created with or without recursion.

Figure 4:
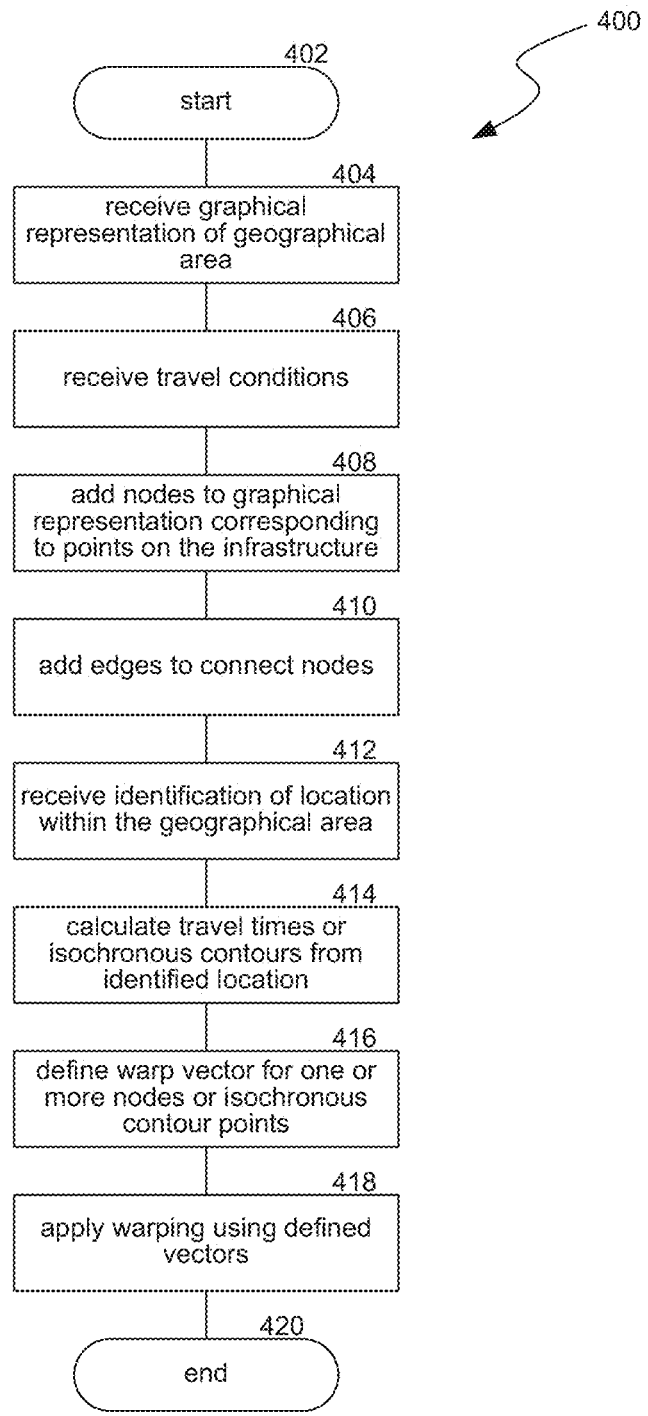
FIG. 4 is a flow diagram illustrating a process for generating a geotemporal graph in accordance with several embodiments of the present technology.

FIG. 4 is a flow diagram illustrating a process 400 for generating a geotemporal graph in accordance with several embodiments of the present technology. After beginning at step 402, the process 400 continues at step 404 by receiving a graph representation of an area that includes a travel infrastructure. At step 406, the process 400 receives travel conditions. As discussed above, travel conditions may comprise, for example, data about factors that affect throughput of the infrastructure included in the graph.

At step 408, nodes corresponding to points on the infrastructure are added to the graph. At step 410, two or more of the nodes are connected with edges. In some embodiments, nodes and edges are added as a single step where interconnected edges are added, and the connection points between the edges form nodes. As discussed above, node and edge creation or placement of pre-defined nodes or edge may be based on a current zoom level and/or graph focus area. As discussed in more detail below in relation to FIG. 5, nodes or edges may be pre-defined for various graphs and stored in a database. Based on an indication of a particular focus area or zoom level, the database may return edges to add to the graph. In other embodiments, node or edge creation and placement may be performed dynamically with an algorithm for each view of a graph.

The process 400 continues at step 412 in which a location within the graph is selected. This selection, for example, may be a user identified point on the graph, a result from a search, a default point such as the center of the current view area, a system selected point such as an identified accident site, or another point selected by a system or system user. In some embodiments, the selected location may not correspond to a node, and a new node may be added to the graph corresponding to the selected location. One or more edges may also be added to connect the new node to one or more other nodes.

At step 414, travel times, or isochronous contours based on increments of travel times, are calculated. The travel times are calculated along the infrastructure from the selected location to nodes or points along location emanating lines of the graph. In some embodiments, travel times are based on a determined quickest path between the selected location and each node or point.

The process 400 continues at step 416 in which warp vectors are defined for one or more of the nodes or points for which travel times are calculated in step 414. The generated warp vectors for nodes or points along location emanating lines may indicate how far that node or point can be moved along its location emanating line so that the distance on the graph between that node or point and the selected location is a consistent representation, across all nodes, of the calculated travel time between that node or point and the selected location.

Continuing at step 418, the process 400 includes applying a warping algorithm, using the warp vectors or isochronous contours, to generate a geotemporal version of the received graph. In some embodiments, for example, the warping algorithm may be a thin-plate spline-based warping algorithm. The process 400 then ends at step 420.

While FIG. 5, discussed below, shows a table whose contents and organization are designed to make them more comprehensible by a human reader, those skilled in the art will appreciate that actual data structures used by the facility to store this information may differ from the table shown in that they for example, may be organized in various other ways, may contain more or less information than shown, may be compressed and/or encrypted, etc.

FIG. 5 is a diagram illustrating portions of a database table 500 for use with some embodiments of a geotemporal graphing system. The table 500, for example, includes entries corresponding to edges that may be added to a graph. In embodiments using the table 500, the infrastructure is a road infrastructure and edges, corresponding to road segments, may be selected to be added to a graph based on a current zoom level and focus area of the graph. Edges in the database are updated periodically with travel conditions, which are used to calculate an expected travel time for each edge.

Column 502 shows an ID stored for each edge database entry. Column 504 shows a start and end location for each edge. When a database query identifying a particular focus area is received, the response may include only those edges that have at least one of their start or end point within the particular focus area.

Column 506 has an identification of various travel conditions that may have been received for a particular edge. Travel conditions may include, for example, traffic, weather, route closures, vehicle departure frequency, vehicle speed or speed limits, and stop frequency. Each travel condition may be associated with an amount of delay corresponding to the travel condition. Travel conditions may be used to calculate travel time or may be used to display indications on the graph of travel conditions such as accidents.

Column 508 shows a timestamp for received travel conditions. Timestamps may be in various formats such as a date and time, or a count of the number of seconds that have elapsed since 00:00:00 Coordinated Universal Time. In some embodiments, timestamps may be used to time-out old travel condition information that is older than a particular threshold.

Column 510 shows zoom levels at which each edge may be displayed. When a database query identifies a particular zoom level, a response may include only those edges that are defined at the identified zoom level. For a given graph, edges may be defined for each of several zoom levels. For example, in a graph including a roadway infrastructure, three zoom levels may be defined. At the highest zoom level, a set of edges may be defined showing a coarse representation for the road infrastructure. At the middle level, several of the high level edges may be included as well as several edges showing more detail in areas with more roads or more twists and turns. Similarly at the lowest zoom level, additional edges may be defined showing greater road infrastructure detail.

Column 512 shows a calculated travel time for each edge. The calculated travel times for an edge may be based on a known distance of the edge and a known speed with which elements travel that edge. The calculated travel times may also be based on travel conditions. For example a travel condition may indicate an adjustment amount due to an indication of an accident, a 20 second delay due to high network traffic, or a 15% slow-down due to heat buildup in a resister. Other information, not shown, may also be stored for each edge such as information that may be used to calculate expected travel time including edge speed limit and road segment length.

Rows 514, 516, and 518 contain examples of data that may be stored for a particular edge. Row 514 shows an edgeID of e1, start and end coordinates of 54,14 and 105,354, traffic conditions consisting of a 20 minute delay, a last update time for travel conditions of Jan. 2, 2014 at 2:07 pm, that edge e1 should be shown at zoom levels 1, 3, and 4, and a travel time for edge e1 of 27.2 units.

Figure 6:
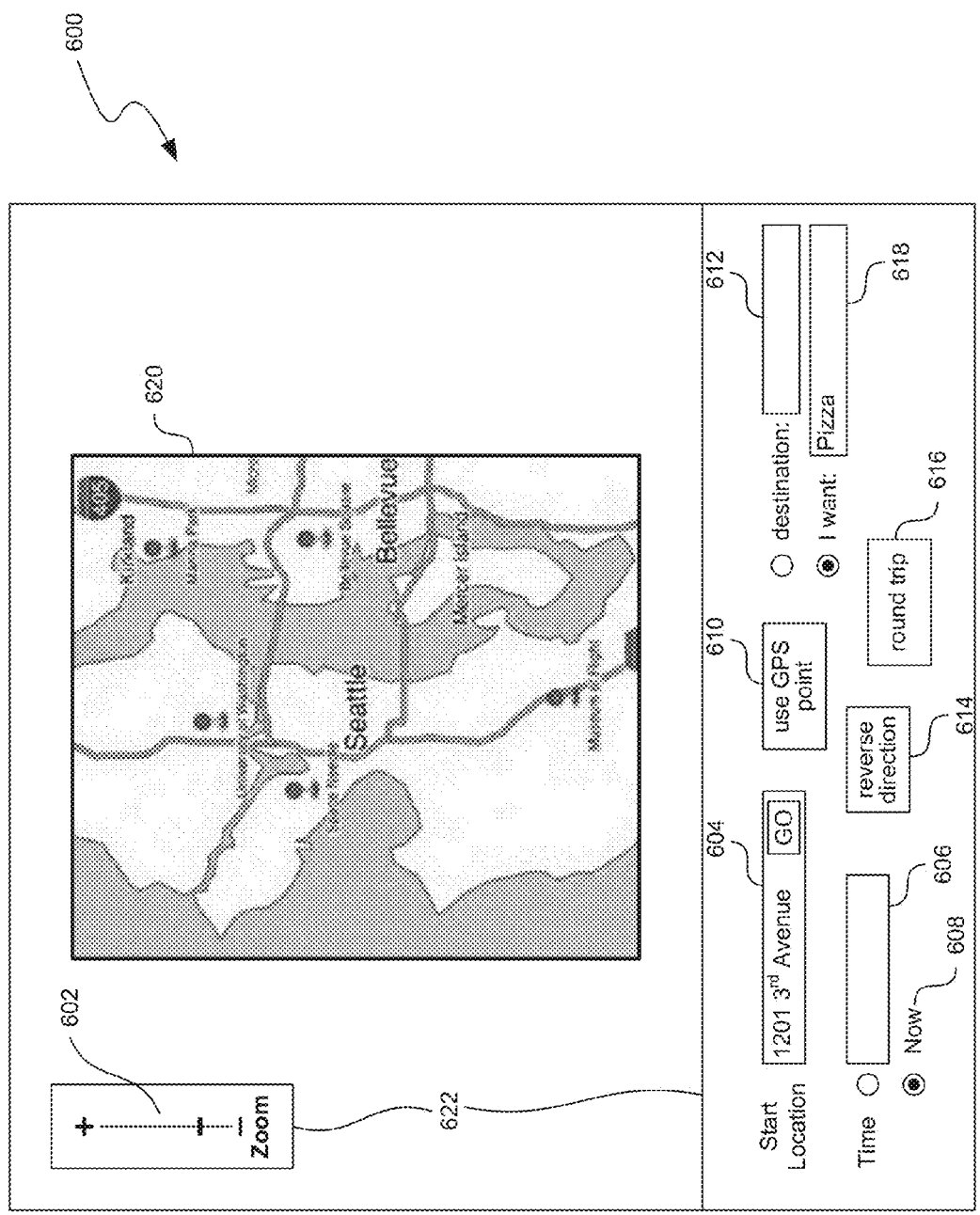
FIG. 6 illustrates some components of a user interface portion which may be used with some roadway infrastructure embodiments of the disclosed technology.

FIG. 6 illustrates some components of a user interface 600 that may be used with some roadway infrastructure embodiments of the disclosed technology. The user interface 600 includes a map portion 620 configured to display a visual representation of a geographic area comprising an infrastructure and a user input portion 622 configured to receive user input. The map portion 620 may be updated such that a displayed spatial distance between a particular location and multiple other points of the map represent an expected travel time from the particular location to the other points on the map, wherein the expected travel times account for traffic conditions at the specified time.

In some embodiments, the user input portion 622 includes a zoom selection 602 that allows a user to select a zoom level for the map portion 620. In some embodiments, user input portion 622 includes a location selection input 604 which allows a user to select a particular start location, such as by entering an address, cross-roads, a landmark, or longitude and latitude coordinates.

In some embodiments, the user input portion 622 includes time selections 606 and/or 608. Time selection 606, for example, may allow a user to select a future time for the system to predict travel conditions or a past time for a user to view historical travel conditions. Time selection 608 may allow a user to indicate that they want current or the most up to date travel conditions. In some embodiments, the user input portion 622 includes a use GPS point selector 610, which allows a user to indicate that the start location should be based on a current GPS or other device generated signal indicating the user's current location.

In some embodiments, the user input portion 622 includes a destination location selection 612, which allows a user to specify a destination. In some embodiments, a route may be displayed between a user selected start location and the destination selected in location selection input 604. In some embodiments, the user input portion 622 includes a reverse direction input 614, which allows a user to specify that the destination should be set as the new start location, the previous selected start location should be set as the new destination, and the map portion 620 should be updated with new travel times calculated from the new start location.

In some embodiments, the user input portion 622 includes a round trip selection 616. The round trip selection 616, for example, allows a user to specify that travel times should be calculated for each point of the graph using round trip travel times from the specified start location. In many instances, a travel time from location A to location B will be different from the travel time from location B to location A. Users may wish to see a geotemporal map indicating not only how accessible various location are, but how accessible they are in light of the need for a return trip.

In some embodiments, the user input portion 622 may also include a category search 618 that allows a user to enter a destination category which may result in multiple matching result locations within that category being displayed on the resulting geotemporal graph.

Figure 7:
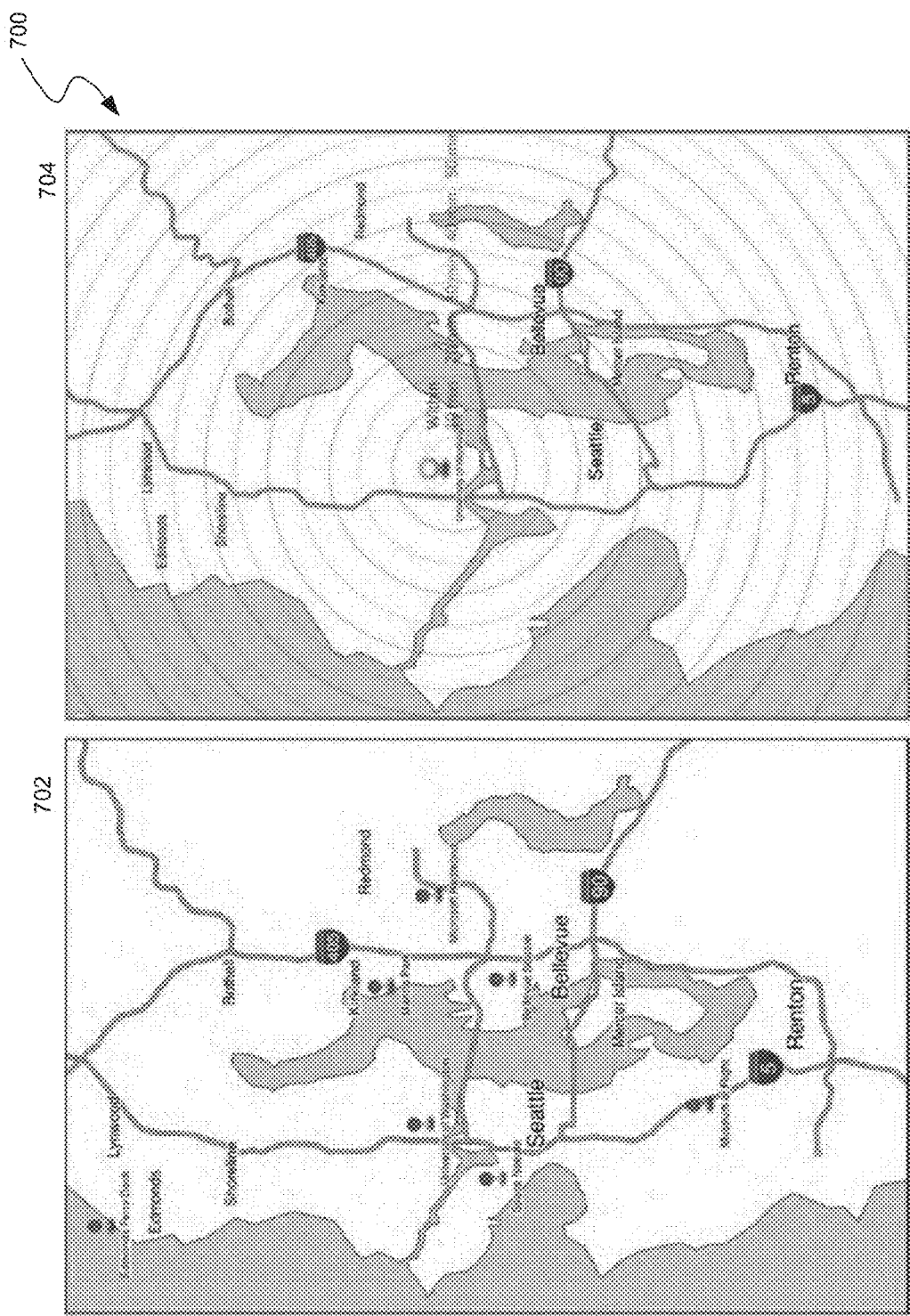
FIG. 7 illustrates an example of a graph with a roadway infrastructure shown before and after one embodiment of the disclosed technology transformed the graph into a geotemporal graph.

FIG. 7 illustrates one particular, example 700 of a graph with a roadway infrastructure shown before and after one embodiment of the disclosed technology transformed the graph into a geotemporal graph. Graph 702, for example, shows a map of Seattle, Washington, using standard cartography. Graph 704 shows a geotemporal version of the graph 702, centered at the University of Washington, using the process 400 described above with respect to FIG. 4 and a particular set of traffic conditions. The graph 704 includes isochronous contours that, after warping, will be circles.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. The various embodiments described herein may also be combined to provide further embodiments.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms may also include the plural or singular term, respectively. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A non-transitory computer readable memory, the computer readable memory storing instructions that, in response to being executed by a computing device, cause the computing device to perform operations for providing a geotemporal graph using travel conditions, the operations comprising:
    obtaining a graph, wherein the graph is a spatial representation of an area;
    adding multiple nodes to the graph, wherein each node corresponds to a point in an infrastructure at an original location for that node in the area represented by the graph, wherein the infrastructure is a transportation infrastructure including a representation of one or more of: roadways, walkways, railways, shipping lanes, air traffic, or any combination thereof;
    adding at least two edges to the graph, wherein the edges represent sections of the infrastructure and connect nodes added to the graph;
    receiving a selection of a location within the graph;
    receiving infrastructure usage data indicating travel conditions on the infrastructure at a particular time; and
    updating a visual representation of the graph by:
        calculating, for each node of the multiple nodes added to the graph, a travel time between that node and the selected location within the graph, wherein each travel time accounts for the received usage data indicating travel conditions;
        defining, for each selected node of the multiple nodes added to the graph, a warp vector identifying a distance to move the selected node from the selected node's original location and a direction to move the selected node from the selected node's original location;
            wherein the direction to move the selected node corresponds to a direction defined by a location emanating line connecting the selected location with the selected node's original location; and
            wherein the distance to move the selected node is defined such that a final distance between the selected location and the selected node, after the selected node is moved the distance to move the selected node in the direction to move the selected node, is a representation of the calculated travel time between the selected node and the selected location; and
        applying a warping algorithm to the graph, using the defined warp vectors, such that each node of the multiple nodes added to the graph is moved according the distance and direction identified in that node's corresponding warp vector.

2. The computer readable memory of claim 1 wherein the infrastructure is a roadway infrastructure and the travel conditions comprise current vehicular traffic conditions.

3. The computer readable memory of claim 1 wherein the operations further comprise:
    determining that the selected location within the graph does not correspond to a node, and in response:
        adding a new node to the graph corresponding to the selected location within the graph; and
        adding at least one edge to the graph connecting the new node with at least one other node.

4. The computer readable memory of claim 1 wherein:
    the multiple nodes are added to the graph such that a greater concentration of nodes are located on the graph in areas determined to have more congestion; and
    areas are determined to have more congestion based on one or more of current congestion conditions and historical congestion conditions.

5. The computer readable memory of claim 1 wherein, for at least one node of the multiple nodes:
    the original location for the at least one node on the graph is at a point along the infrastructure that, based on the infrastructure usage data, is at a specified travel time interval from the selected location; and
    the distance to move the at least one node corresponds to the distance from the original location of the at least one node to an isochronous contour defined for the specified travel time interval that was used in determining the original location for the at least one node.

6. A method for providing a geotemporal mapping using traffic data, the method comprising:
    obtaining a graph, wherein the graph is a spatial representation of an area;
    adding multiple points to the graph, wherein each point has an original location,
    receiving a selection of a location within the graph;
    receiving infrastructure usage data indicating travel conditions on an infrastructure in the area of the graph at a particular time, wherein the infrastructure is a transportation infrastructure including a representation of one or more of: roadways, walkways, railways, shipping lanes, air traffic, or any combination thereof; and
    updating a visual representation of the graph by:
        calculating, for each point of the multiple points added to the graph, a travel time between that point and the selected location within the graph, wherein each travel time accounts for the received usage data indicating travel conditions;
        defining, for each selected point of the multiple points added to the graph, a warp vector identifying a distance to move the selected point from the selected point's original location and a direction to move the selected point from the selected point's original location, wherein the direction to move the selected point corresponds to a direction defined by a location emanating line connecting the selected location with the selected point's original location; and wherein the distance to move the selected point is defined such that a resulting distance between the selected location and the selected point, after the selected point is moved the distance to move the selected point in the direction to move the selected point, is a representation of the calculated travel time between the selected point and the selected location; and applying a warping algorithm to the graph, using the defined warp vectors, such that each of the multiple points added to the graph is moved according the distance and direction identified in that point's corresponding vector.

7. The method of claim 6 wherein (a) the location of at least one of the multiple points or (b) at least one edge that connects two points, was previously specified by a user of the system.

8. The method of claim 6 wherein the at least one of the travel times is calculated as a shortest travel time.

9. The method of claim 6 wherein adding multiple points to the graph comprises selecting from a specified set of nodes, a subset of nodes corresponding to a current zoom level or focus area.

10. A visual display system for presenting a geotemporal graph using traffic condition data, the system comprising:

a memory; and one or more processors;

wherein the memory stores instructions that, when executed by the one or more processors, cause the visual display system to perform operations comprising:

displaying a visual representation of a geographic area comprising an infrastructure, wherein the infrastructure is a transportation infrastructure including a representation of one or more of: roadways, walkways, railways, shipping lanes, air traffic, or any combination thereof;

receiving input specifying a location and a time; and upon receiving the location, updating the visual representation of the geographic area by:

defining, for each selected point of multiple points on the geotemporal graph, a warp vector identifying a distance to move the selected point from an original location of the selected point and a direction to move the selected point from the selected point's original location, wherein the direction to move the selected point corresponds to a direction defined by a location emanating line connecting the selected location with the selected point's original location, and wherein the distance to move the selected point is defined such that a resulting distance between the selected location and the selected point, after the selected point is moved the distance to move the selected point in the direction to move the selected point, is a representation of an expected travel time between the selected point and the selected location, accounting for traffic conditions at the specified time; and applying a warping algorithm to the graph, using the defined warp vectors, such that each point of the multiple points is moved according the distance and direction identified in that point's corresponding vector.

11. The visual display system of claim 10 wherein:

receiving the input includes receiving a location signal indicating a current location of a computing device; and the operations further comprise periodically modifying the visual representation of the geographic area with a new location corresponding to the current location such that displayed spatial distances between the new location and the multiple points of the geographic area represent new expected travel times between the new location and the multiple points, wherein the new expected travel times account for traffic conditions.

12. The visual display system of claim 10 wherein:

receiving the input includes receiving user input indicating a desired category of destination; and the operations further comprise, upon receiving the desired category of destination, displaying on the visual representation of the geographic area multiple identifiers, wherein each of the multiple identifiers correspond to the desired category.

13. The visual display system of claim 10 wherein:

the specified location is a first location; and the operations further comprise:

receiving a second location; and upon receiving the second location, updating the visual representation of the geographic area such that a route is displayed between the first location and the second location.

14. The visual display system of claim 10 wherein the operations further comprise:

receiving an end location and a reverse direction user input; and upon receiving the reverse direction user input, updating the visual representation of the geographic area such that displayed spatial distances between the end point and the multiple points of the geographic area represent an expected travel time from the end location to the multiple points, wherein the expected travel times account for traffic conditions at the specified time.

15. The visual display system of claim 10 wherein:

each expected travel time between the specified location and each of the multiple points is a round-trip travel time; and the expected travel times account for traffic conditions both (a) going from the specified location to each other point and (b) going from each other point to the specified location.

16. The visual display system of claim 10 wherein:

the specified location is a destination; and the operations further comprise:

receiving, as at least some of the multiple points, indications of multiple start points; and updating the visual representation of the geographic area by displaying a spatial distance between each of the multiple start points and the destination such that, for each of the multiple start points, the displayed spatial distance between that start point and the destination represents an expected travel time from that start point to the destination.

17. The visual display system of claim 16 wherein each of the multiple start points correspond to a location of an emergency response person or vehicle.

18. The visual display system of claim 10 wherein the specified time comprises one of now and a specified future time.

19. The visual display system of claim 10 wherein the visual representation of the geographic area is further updated such that the visual representation of the geographic area is overlaid with a series of concentric equally spaced circles centered at the specified location.

* * * * *